United States Patent
Green et al.

(10) Patent No.: US 10,003,951 B2
(45) Date of Patent: Jun. 19, 2018

(54) AUTOMATED MOBILE DEVICE ONBOARD CAMERA RECORDING

(71) Applicant: Sirqul, Inc., Seattle, WA (US)

(72) Inventors: Jason Mathew Green, Renton, WA (US); Christopher Arthur General Alviar, Seattle, WA (US); Thomas Dieter Winkler, Vancouver (CA)

(73) Assignee: Sirqul, Inc., Seattle, WA (US)

( * ) Notice: Subject to any disclaimer, the term of this patent is extended or adjusted under 35 U.S.C. 154(b) by 0 days. days.

(21) Appl. No.: 15/442,505

(22) Filed: Feb. 24, 2017

(65) Prior Publication Data

US 2017/0251331 A1 Aug. 31, 2017

Related U.S. Application Data

(60) Provisional application No. 62/299,874, filed on Feb. 25, 2016.

(51) Int. Cl.
*H04B 7/00* (2006.01)
*H04W 4/00* (2018.01)
*H04L 29/08* (2006.01)

(52) U.S. Cl.
CPC ............ *H04W 4/80* (2018.02); *H04L 67/12* (2013.01); *H04W 4/005* (2013.01); *H04W 4/008* (2013.01); *H04W 4/70* (2018.02)

(58) Field of Classification Search
CPC ........ H04W 4/008; H04W 4/005; H04L 67/12
See application file for complete search history.

(56) References Cited

U.S. PATENT DOCUMENTS

| 8,493,198 B1* | 7/2013 | Vasquez | B60Q 9/008 340/425.5 |
| 9,679,487 B1* | 6/2017 | Hayward | G08G 1/166 |
| 2003/0041329 A1 | 2/2003 | Bassett | |
| 2013/0155237 A1* | 6/2013 | Paek | G06F 1/1632 348/148 |
| 2013/0295912 A1 | 11/2013 | Chen | |
| 2015/0264554 A1 | 9/2015 | Addepalli et al. | |
| 2015/0312404 A1* | 10/2015 | Abramson | H04W 4/027 455/418 |
| 2015/0356872 A1 | 12/2015 | Atsmon et al. | |
| 2017/0089717 A1* | 3/2017 | White | G01C 21/3658 |
| 2017/0115130 A1* | 4/2017 | An | G01C 21/3682 |

OTHER PUBLICATIONS

PCT International Search Report and Written Opinion, PCT Application No. PCT/US17/19514, dated May 11, 2017, 9 pages.

* cited by examiner

*Primary Examiner* — Nguyen Vo
(74) *Attorney, Agent, or Firm* — Seed IP Law Group LLP (57) ABSTRACT

Embodiments of the system herein use a mobile device of a user to act as an onboard camera and capture video of the environment surrounding the user's vehicle and/or telematics data about the user's vehicle. The system can detect when a user has begun to operate the vehicle, for example based on mobile device power information and the proximity/connection of the mobile device to a device associated with the vehicle, and automatically begin onboard camera recording or prompt the user to begin onboard camera recording. The recorded videos and/or telematics data can be locally stored on the mobile device, or in some embodiments transferred to an outside server for storage.

14 Claims, 5 Drawing Sheets

AUTOMATED MOBILE DEVICE ONBOARD CAMERA RECORDING

CROSS REFERENCE

This application claims a benefit of U.S. Patent Application No. 62/299,874, filed Feb. 25, 2016, the content of which is incorporated by reference it its entirety.

TECHNICAL FIELD

This disclosure relates to the field of vehicle onboard camera recording and data capture, including telematics data.

BACKGROUND

This disclosure relates generally to the field of onboard camera recording. An onboard camera is a camera configured to record the operation of or internal or external environment of a vehicle while the vehicle is in operation. Video captured by an onboard camera can capture incidents (such as crashes or the actions of other vehicles) that occur while the vehicle is operated. Therefore, onboard camera videos are useful for crash analysis or generally to record events that occur around the vehicle. However, existing onboard camera solutions may be expensive and specialized equipment and/or may require manual activation to ensure reliable recording when the vehicle is in operation. Therefore a system for detecting a vehicle is being operated and recording onboard camera video using existing or low cost hardware available to a user is needed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of the system herein use a mobile device to be configured as an onboard camera and capture video of the environment surrounding a vehicle (hereinafter, "onboard camera recording"). The mobile device may be a mobile device personal to a user or like entity. The onboard camera may be referenced as a "dashboard camera" or "dashcam." The onboard camera may be used on ground vehicles, e.g., a car, truck or motorcycle, water vehicles, e.g., a ship or boat, and/or aerial vehicles, e.g., a plane or helicopter. Similarly, example embodiments of the system herein capture telematics data, for example sensor data from sensors of a mobile device, e.g., an accelerometer, gyroscope, or compass of a mobile device, or any other suitable sensor data. In some example embodiments, the mobile device may capture "enhanced video" comprising a video recording with accompanying, e.g., simultaneous or synchronized, telematics data. For example, onboard camera recording can occur simultaneously with telematics data capture, and the resulting captured video and telematics data can be associated and stored as enhanced video.

The system may be configured to detect when a user has begun to operate the vehicle, for example based on mobile device power information and the proximity/connection of the mobile device to a device associated with the vehicle, and automatically begin onboard camera recording or prompt the user to begin onboard camera recording. The recorded videos (hereinafter "onboard camera videos") can be locally stored on the mobile device, or in some embodiments transferred to an outside server for storage.

Example Environment

Figure 1:
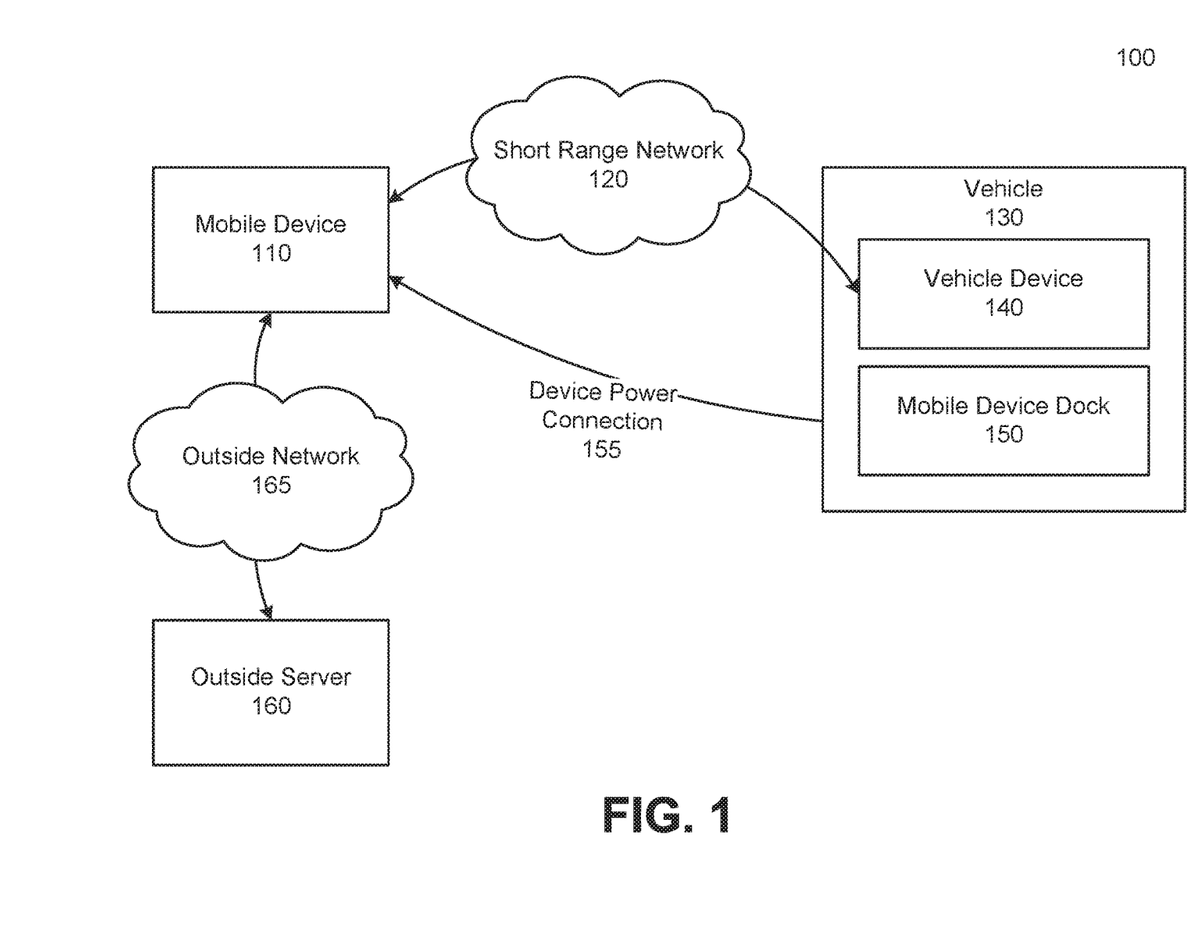
FIG. 1 illustrates an environment in which mobile device onboard camera recording can occur, according to an example embodiment.

FIG. 1 illustrates an environment in which a mobile device onboard camera recording can occur, according to an example embodiment. The environment of FIG. 1 may include a mobile device 110, an outside server 160, a vehicle, 130, a short range network 120 and an outside network 165. The vehicle 130 may include a vehicle device 140 and a mobile device dock 150. The mobile device 110 may be connected to the vehicle device 140 of the vehicle 130 through the short range network 120. The mobile device dock 150 of the vehicle 130 may be configured to provide the mobile device 110 with power through a device power connection 155. Additionally, the mobile device 110 is connected to an outside server 160 through an outside network 165. The outside network 165 may be a wireless network, e.g., a cellular and/or WiFi network, and may include connectivity to the Internet. The vehicle device 140 and the mobile device dock 150 are further described below.

The mobile device 110 may be a portable computing device that may be configured to capture video and communicate with the vehicle device 140 over the short range network 120. For example, the mobile device 110 may be a smartphone, laptop, action camera, or any other suitable device. The mobile device 110 may have one or more integrated cameras capable of recording video footage from the mobile device (hereinafter, "mobile device cameras"). Each mobile device camera can be associated with one or more microphones of the mobile device 110 which can capture sound corresponding to the captured video. The specific number, orientation, and position of mobile device cameras can vary based on the specific mobile device 110, for example, a mobile device 110 may comprise two mobile device cameras, one front facing and one rear facing, such as in a smartphone having a front camera and back camera. Similarly, a mobile device 110 may comprise a variety of sensors capable of capturing telematics data. The sensors may be, for example, mobile device sensors. The specific number, orientation, and position of mobile device sensors can vary based on the specific mobile device 110, for example, a mobile device 110 may comprise several accelerometers and gyroscopes capable of determining the acceleration and orientation of the mobile device 110.

Using one or more mobile device cameras, the mobile device 110 may be configured to capture onboard camera footage. Similarly, using one or more mobile device sensors, the mobile device may be configured to capture telematics data. A mobile device 110 may be capable of connecting to the vehicle device 140 over a short range network 120 and to the outside server 160 over the outside network 165, according to some embodiments. According to some example embodiments, a mobile device 110 can be supplied power through the device power connection 155 supplying power from the vehicle 130 or an external source such as through a power connector of the mobile device 110. For example, a mobile device 110 such as a smartphone can receive power through an input/output (I/O) port on the mobile device 110, for example, a universal serial bus (USB) or lightning port or a wireless charging connection (e.g., inductive or resonant).

It is noted that mobile devices 110, as well as other devices described herein (e.g., vehicle devices 140, or the outside server 160) may include computing components such at least one processor (and/or controller), a memory, a network interface, and a storage. These devices include operating systems that are stored in memory and/or storage and used with computer programs comprised of instructions (also stored in memory and/or storage) and executable by the processor. For example, the memory may be a temporary memory (e.g., random access memory). The storage may be a non-transitory storage device (e.g., a flash memory, magnetic disk). The instructions (e.g., program code or software) stored in the memory and/or storage, which are executable by the processor, may correspond to the modules and/or processes described herein. By way of example, the modules may be program code configured to have the processor perform particular functionality as described. Also by way of example, the processes may correspond to steps executed by the processor to enable a particular output. The mobile device 110 will be discussed in greater detail in relation to FIG. 2.

The short range network 120 can be a local area or other limited range network and can be wired, wireless, or a combination of wired and wireless networks. For example, a network 120 may use standard communication protocols, for example Bluetooth, Bluetooth Low Energy (BLE) or Radio Frequency IDentification (RFID). In some implementations, a connection between two devices over the short range network is an indicator of the relative physical proximity of those devices. For example, an example short range network 120 can have an expected range of 15 feet. Therefore, a device connected to the short range network 120 can assume it is within the expected range, 15 feet in this example, of another device to which that device is connected over the short range network.

The vehicle 130 can be any suitable vehicle capable of physically transporting people or goods and from which it is possible to record onboard camera footage. For example, the vehicle 130 can be a car, truck, motorcycle, bicycle, recreational vehicle (RV), or the like. In some embodiments the vehicle includes a windshield or other viewport similar for recording through. In the embodiment of FIG. 1, the vehicle 130 comprises a vehicle device 140 and a mobile device dock 150. The interactions of the vehicle 130 with other vehicles, pedestrians, or terrain features can be captured through onboard camera recording. Similarly, telematics data from the vehicle can be gathered through integrated sensors of the vehicle, or through sensors of an associated vehicle device 140 (e.g., a trailer), or of a mobile device 110 determined to be traveling in the vehicle 140.

The vehicle device 140 may be a device associated with and linked to the vehicle 130 capable of communicating with and identifying the vehicle 130 to the mobile device 110. In some example implementations, the vehicle device 140 also determines the proximity of the mobile device 110 to the vehicle 130 and can instruct the mobile device 110 to begin onboard camera recording, for example, causing the mobile device 110 to launch an application for onboard camera recording. In some example embodiments, the vehicle device 140 may be physically connected to the vehicle 130, for example, affixed or positioned on or on the vehicle 130. The vehicle device 140 may be configured to connect with a mobile device 110 over the short range network 120, according to some embodiments. For example, the vehicle device 140 may be equipped with a Bluetooth low energy (BLE) radio for communication over a short range network 120 and a hardware button capable of receiving user input to the vehicle device 140. In some implementations, the vehicle device 140 may be powered through a power source of the vehicle 140, e.g., a cigarette lighter receptacle or integrated USB port. The vehicle device 140 will be discussed in further detail in reference to FIG. 3.

The mobile device dock 150 may be a mechanical structure for physically securing and positioning the mobile device 110 within the vehicle 130. The mobile device dock 150 can physically position the mobile device 110 such that one or more mobile device cameras are in suitable positions for onboard camera recording. For example, the mobile device dock 150 may be located on the dashboard of a car and position a mobile device 110 camera to record through the windshield of the car. In some example implementations, the mobile device dock 150 may be built into, or otherwise physically secured to the vehicle 130 and can also incorporate a suitable method for establishing a device power connection 155 such as a power cable connected to a power source of the vehicle 130. In some example embodiments, the vehicle device 140 and associated functionality is integrated into the mobile device dock 150.

The device power connection 155 provides power to the mobile device 110 from a power source of the vehicle 130. For example, the device power connection may be a cigarette lighter receptacle or USB port. A cigarette lighter plug or a USB connector may be used to connect the mobile device 150 with the cigarette lighter receptacle or USB port. The power to the cigarette lighter receptacle or USB port may be supplied by a car battery of the vehicle 110.

The outside server 160 may be a computer system configured to receive onboard camera videos from the mobile device 110 over the outside network 165. The outside server 160 may be any suitable computer, server system, cloud-based storage system, or group or cluster of computer/server systems. An outside network 165 may have any combination of local area and wide area networks and can be wired, wireless, or a combination of wired and wireless networks. For example, an outside network 165 may use standard communication protocols, for example hypertext transport protocol (HTTP) or transmission control protocol/Internet protocol (TCP/IP) over technologies such as Ethernet, 4G, or a digital subscriber line (DSL). In some implementations, data transmitted over the outside network 165 is encrypted. The outside server can be capable of receiving and storing onboard camera videos, telematics data, and/or enhanced video. In some embodiments, the outside server 160 can separately or simultaneously receive an onboard camera video and associated telematics data and associated them into an enhanced video.

Example Mobile Device

Figure 2:
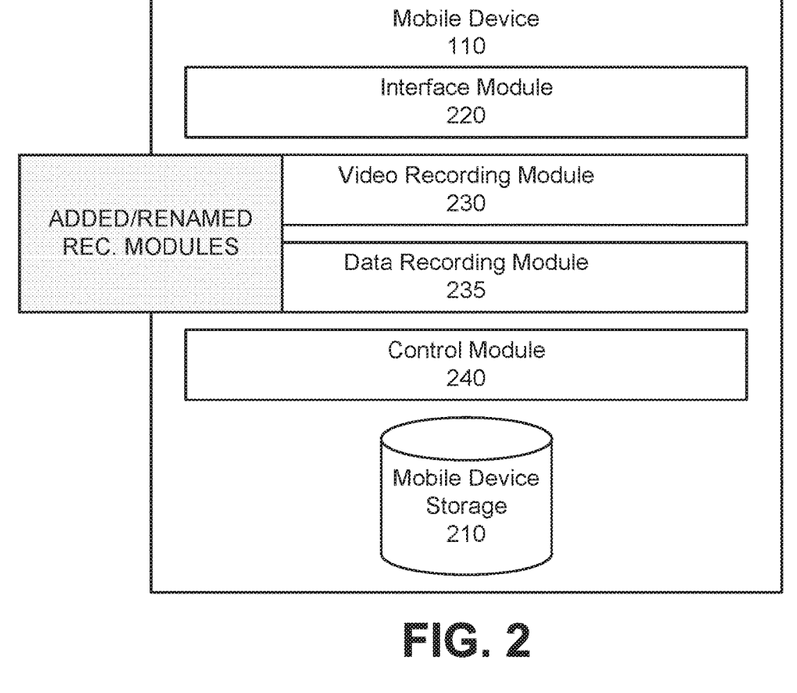
FIG. 2 illustrates an example mobile device, according to an example embodiment.

FIG. 2 illustrates an example mobile device, according to an example embodiment. The mobile device 110 of FIG. 2 may include mobile device storage 210, an interface module 220, video recording module 230, data recording module 235, and control module 240. A mobile device 110 may include an onboard camera recording application configured to be activated on the mobile device 110 upon predefined triggering events. When activated by a triggering event, the mobile device 110 may be configured to launch the onboard camera recording application. The onboard camera recording application, when executed, may be configured to control onboard camera recording from one or more mobile device cameras of the mobile device 110. Similarly, the onboard camera recording application may be configured to control telematics data capture from one or more sensors of the mobile device 110. For example, the onboard camera recording application may be configured to start and stop capture and/or storage of data from the sensors, e.g., from the mobile device and/or vehicle.

The onboard camera recording application can be triggered, e.g., activated or opened, based on events that may be user initiated or automated. By way of example, a user initiated event may be user input through the mobile device 110, e.g., to manually launch the application. An automated event may be based on instructions received from another component, for example, from the vehicle device 140 or based on any other suitable criteria, for example connection to a specific vehicle device 140 or connection to an external power source, such as through the device power connection 155. In some embodiments, onboard camera recording and/or telematics data capture starts whenever the onboard camera recording application is opened, but in other implementations the onboard camera recording application can be open, and onboard camera recording and/or telematics data capture may be configured to start based on a user input to the onboard camera recording input, or other suitable trigger (such as an instruction from the vehicle device 140).

The mobile device storage 210 is internal storage of the mobile device 110 capable of storing video recordings. The mobile device storage 210 may be any suitable storage technology, for example, solid state flash storage, or internal disk storage, and can be removable or build in to the mobile device 110. For example, the mobile device storage 210 can be a removable SD card, internal flash memory, or internal hard drive of the mobile device. The mobile device storage 210 can store onboard camera video recorded by a mobile device camera of the mobile device 110 as it is recorded from a mobile device camera. Similarly, the mobile device storage 210 can store telematics data captured from one or more sensors of the mobile device 110, according to some embodiments. In some implementations, the mobile device storage also stores enhanced video comprising onboard camera video and telematics data.

The interface module 220 may enable a mobile device 110 to connect to other devices and servers over one or more networks. For example, the interface module 220 may be configured to enable the mobile device 110 to connect to a vehicle device 140 over the short range network 120. In some example embodiments, the interface module 220 may be configured to automatically detect and connect to a vehicle device 140 when the vehicle device 140 is detected on the short range network 120. In some example implementations, geo-fencing, or other geolocation techniques can be implemented to activate the short range network 120. For example, a geo-fence around the vehicle 130 can cause the mobile device 110 to determine if the mobile device 110 is currently able to search for and detect other devices over the short range network 120. If hardware of the mobile device 110 associated with communication over the short range network 120 (such as a Bluetooth or BLE radio) is deactivated, for example for power consumption reasons, that hardware can be reactivated based on entering the geo-fence. In some example embodiments, the short range network hardware of the mobile device 110 is directly reactivated, however in other embodiments a message or notification can be sent to the user prompting the user to reactivate the relevant functionality of the mobile device 110 to connect to other devices over the short range network 120. Once connected, to the vehicle device 140, the interface module 220 may be configured to receive commands from the vehicle device 140 over the short range network 120. For example, commands to open the onboard camera recording application or notifications of a user input received at the vehicle device 140. Similarly, the interface module 220 may be configured to enable the mobile device 110 to connect to the outside server 160 over the outside network 165. In some example embodiments, once connected over the outside network 165, the mobile device 110 can send previously captured onboard camera videos to the outside server 160 for storage.

According to some example implementations, the video recording module 230 may be configured to control video capture through the mobile device camera or cameras, for example, to capture onboard camera video. For example, the video recording module 230 may be configured to begin, maintain, and end recording through each of the mobile device cameras, and can choose parameters of the captured video, for example, frame rate, resolution, bitrate, zoom level, usage of associated microphones, and the like. The video recording module 230 can start, end, store, or modify the parameters of an ongoing onboard camera recording based on instruction from the control module 240. In some implementations, onboard camera recording operates using a loop system to conserve storage space in the mobile device storage 210. In this example system, the onboard camera records cyclically to an "onboard camera loop" of a predetermined length, for example 15 minutes. When the onboard camera loop is at the predetermined length, the oldest section of the onboard camera loop is overwritten with the current output of the mobile device camera. Based on a user input or other suitable trigger, the onboard camera loop or portions of the onboard camera loop may be configured to separately save as onboard camera videos to the mobile device storage 210.

Similarly to the video recording module 230, the data recording module 235 may be configured to control capture of telematics data through one or more mobile device sensors. For example, the data recording module 235 may be configured to begin, maintain, and end telematics data capture through each of the mobile device sensors, and can choose parameters of the captured data, for example, sampling rate, resolution, sensitivity, and the like. The data recording module 235 can start, end, store, or modify the parameters of an ongoing telematics data capture based on instruction from the control module 240. In some example implementations, telematics data capture operates using a loop system to maintain telematics data associated with onboard camera recording. In this example system, the sensors capturing telematics data record cyclically to a "telematics data loop" of a predetermined length, for example 15, 30, 60, or 90 minutes. The telematics data loop can operate in sync with, or otherwise correspond to the onboard camera loop. When the telematics data loop is at the predetermined length, the oldest section of the telematics data loop is overwritten with the current output of the sensors. Based on a user input or other suitable trigger, the telematics data loop or portions of the onboard camera loop may be configured to be separately saved to the mobile device storage 210 as captured telematics data.

In some example embodiments, the control module 240 is part of the onboard camera recording application and is active only when the onboard camera recording application is opened or otherwise active on the mobile device 110. The control module 240 determines when to start and stop onboard camera recording and telematics data capture, and when to store onboard camera videos or captured telematics data, for example based on user inputs and other criteria. The control module 240 may be configured to instruct the video recording module 230 to begin onboard camera recording and/or the data recording module 235 to begin telematics data capture after determining both that the mobile device 110 is connected to an external power source, for example through the device power connection 155, and that the vehicle device 140 is connected to the mobile device 110 over the short range network 120. As described previously, a vehicle device 140 can be associated with a specific vehicle 130. In some implementations, specific vehicles 130 (and/or corresponding vehicle devices 140) can be registered with the mobile device 110. The control module 240 may be configured to begin onboard video recording or telematics data capture based on connections to registered vehicle devices 140. This can allow, for example, a user to register a vehicle device 140 associated with their personal vehicle, and only begin onboard camera recording when in their own vehicle. In some implementations, the onboard camera recording application is triggered on connection to a registered vehicle device 140 (and can therefore begin recording based on connection to the registered vehicle device 140). In other embodiments, the control module 240 may be configured to receive instructions from the vehicle device 140 instructing the control module 240 to begin onboard camera recording or telematics data capture. For example, the vehicle device 140 can determine when to begin onboard camera recording or telematics data capture and send corresponding instructions to the control module 240, for example over the short range network 120. In response, the control module 240 can begin onboard camera recording or telematics data capture based on the received instructions. In some example embodiments, telematics data capture may be linked to onboard video recording and occurs concurrently to onboard video recording when onboard video recording occurs. In other example embodiments, telematics data capture occurs independently of onboard video recording and may be triggered based on different criteria, although corresponding captured telematics data and onboard camera video by be linked (such as in an enhanced video). For example, in some embodiments, telematics data capture is triggered when the mobile device 110 connects to a vehicle device (for example a registered vehicle device) over the short range network 120, independently of whether onboard camera recording is being captured.

While onboard camera recording is ongoing, the control module 240 may be configured to save onboard camera videos based on user input or any other suitable reason. For example, the mobile device 110 may be configured to receive a user input or other instruction, for example, from the vehicle device 140, instructing the mobile device to save an onboard camera video and captured telematics data. Also by example, detected events, such as a collision detection event detected based on telematics data (for example a sharp deceleration detected by an accelerometer of the mobile device) can cause the mobile device to save an onboard camera video and the corresponding captured telematics data. In some example embodiments, in response to the user input or instruction, the mobile device 110 stores a predetermined length onboard camera video from the onboard camera loop and corresponding captured telematics data from the telematics data loop, for example, the last 5 minutes of onboard camera recording and the corresponding (e.g., simultaneous or synchronized) 5 minutes of telematics data can be saved in response to a user input or other event. In some example embodiments, the mobile device 110 also saves a predetermined length onboard camera video and corresponding telematics data after the user input is received. In some example embodiments, stored onboard camera videos and captured telematics data can additionally be transferred to the outside server 160, or can be queued to be transferred when a connection to the outside server 160 is established.

The mobile device 110 may end onboard camera recording based on suitable predefined conditions, for example, a user input, loss of the device power connection 155, or loss of connection to the vehicle device 140 over the short range network 120. When onboard camera recording is ended, the mobile device 110 stops capturing video through the mobile device camera, and the existing onboard camera loop is saved to be resumed later, according to some example embodiments. For example, the next time onboard camera recording starts, the existing (saved) onboard camera loop can be utilized. Alternatively, the onboard camera loop can be discarded or wholly or partially saved as an onboard camera video for later reference.

Example Vehicle Device

Figure 3:
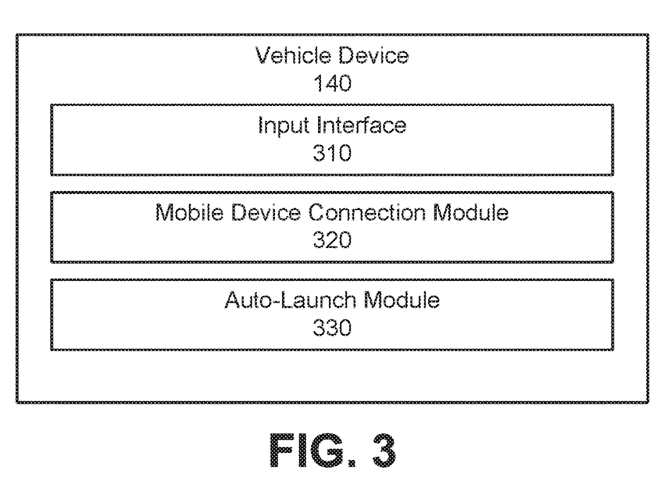
FIG. 3 illustrates an example vehicle device, according to an example embodiment.

FIG. 3 illustrates an example vehicle device 140, according to an example embodiment. The vehicle device 140 of FIG. 3 may include an input interface 310, a mobile device connection module 320, and an auto launch module 330.

The input interface 310 may be any suitable hardware input mechanism configured to receive user interaction, or input. Further, it may be configured to be integrated into the vehicle device 140. For example, the input interface 310 can be a button, switch, slider, touchpad, capacitive or motion sensor, or the like. The input interface 310 can allow a user to communicate with the vehicle device 140 directly, or with the mobile device 110 via the vehicle device 140. In some embodiments, the input interface 310 is a button which, when pressed, indicates that the user intends to save a specific onboard camera video.

According to some example implementations, the mobile device connection module 320 enables the vehicle device 130 to connect to the mobile device 110 over the short range network 120. In some implementations, the mobile device connection module 320 connects the vehicle device 140 to the mobile device 110 automatically whenever the mobile device 110 is detected by the vehicle device 140 to be physically connected with the vehicle device 140 and/or within a predefined range of the vehicle device 140. For example, the mobile device connection module can control a BLE radio of the vehicle device 140 to connect over the short range network 120 to the mobile device 110.

The auto-launch module 330, according to some example embodiments, may be configured to transmit (or send) instructions to the mobile device 110 when specific conditions are detected by the vehicle device 140. Instructions can be sent via the mobile device connection module 320 of the vehicle device 140 over the short range network 120. The auto-launch module 330 can monitor various conditions and automatically cause onboard camera recording to begin at the mobile device 110, even when the onboard camera recording application is not active on the mobile device 110. For example, the auto-launch module 330 may be configured to instruct the mobile device 110 to open the onboard camera recording application or to begin onboard camera recording based on inferring that the mobile device 110 is in or on the vehicle 130 (for example, secured to the mobile device dock 150) while the vehicle is in operation. In some example embodiments, the auto-launch module 330 first determines that the vehicle device 140 is connected to the mobile device 110 over the short range network 120, indicating, due to the limited range of the short range network 120, that the mobile device 110 and the vehicle device 140 are in close proximity. Then the auto-launch module 330 listens for a "charging" event in the mobile device 110, which, due to the already established proximity of the mobile device 110 and the vehicle 130, is likely supplied by the vehicle 130. When all conditions are met, the auto-launch module 330 can transmit an appropriate instruction to the mobile device 110, for example an instruction for the mobile device 110 to launch or activate the onboard camera recording application or an instruction for the mobile device 110 to begin onboard camera recording.

Example Onboard Camera Positioning

Figure 4:
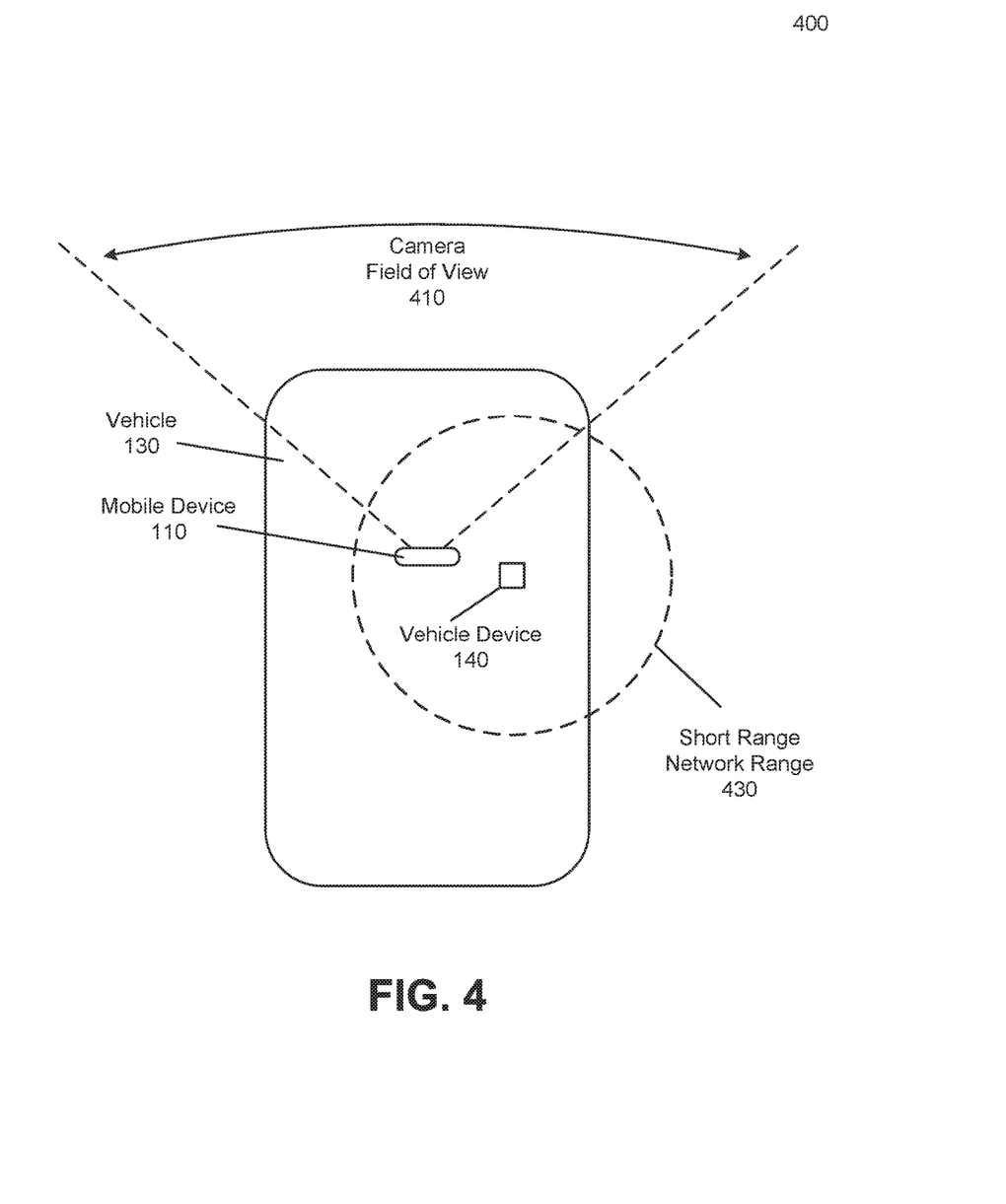
FIG. 4 illustrates example environment illustrating the positioning of a mobile device within a vehicle.

FIG. 4 illustrates example environment illustrating the positioning of a mobile device within a vehicle. The environment 400 of FIG. 4 may include the vehicle 130 and vehicle device 140 with a short range network range 430, and a mobile device 110 positioned to afford the camera of the mobile device 110 a specific camera field of view 410.

In the environment 400 of FIG. 4, the vehicle 130 contains both the mobile device 110 and the vehicle device 140, which as previously described, is associated with the vehicle 130. The mobile device 110 may be within the short range network range 430 of the vehicle device, and, in this example, the mobile and vehicle devices 110 and 140 are connected through the short range network 120. The mobile device has been positioned within the vehicle 130 so that a mobile device camera of the mobile device 110 has the camera field of view 410. For example, the mobile device can be removably secured to a mobile device dock 150 within the vehicle 130.

Example Processes

Figure 5:
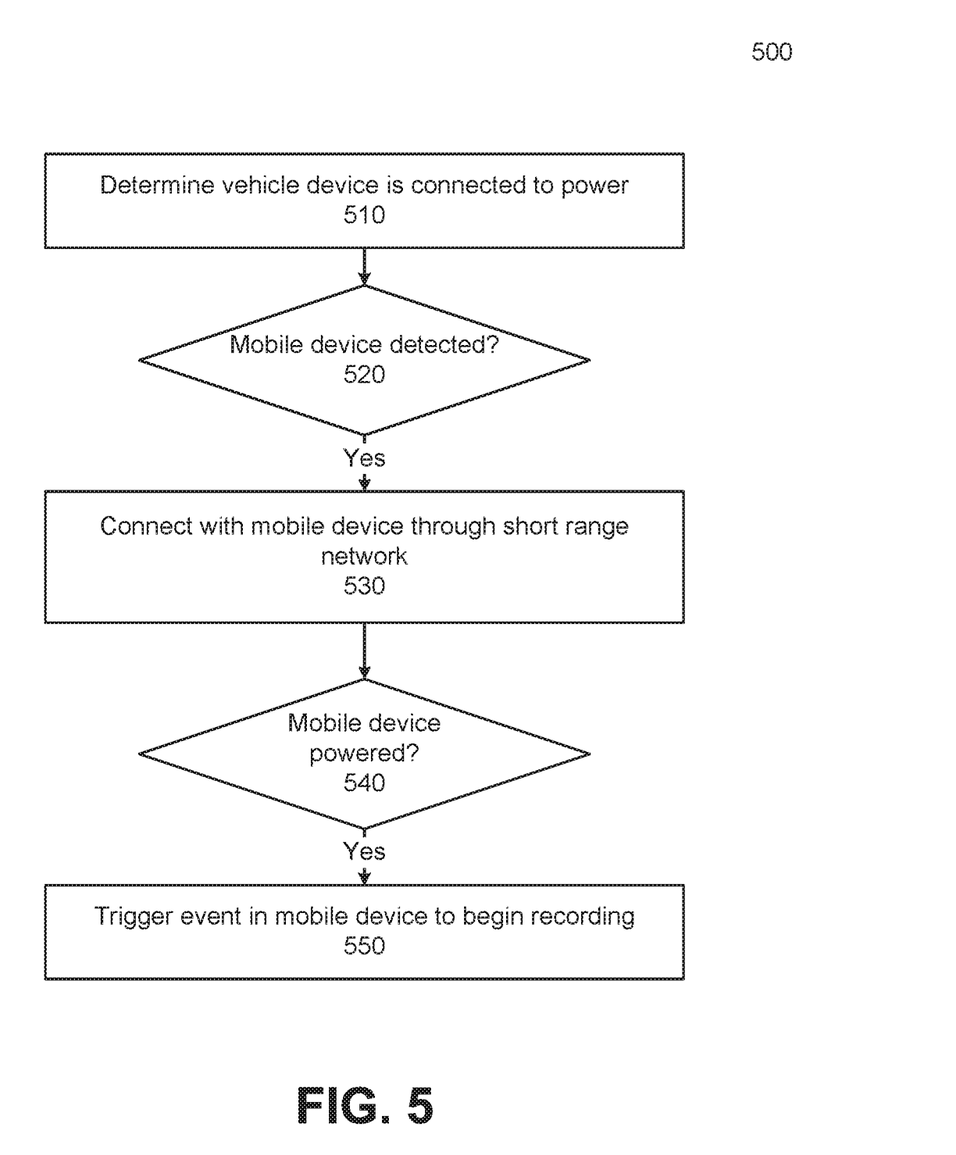
FIG. 5 is a flowchart illustrating an example process for instructing a mobile device to begin recording onboard camera footage.

FIG. 5 is a flowchart illustrating an example process for instructing a mobile device to begin recording onboard camera footage. The process 500 of FIG. 5 begins when a vehicle device associated with a vehicle determines 510 that it is connected to a power source, for example, from the power source of the vehicle 130. When the vehicle 130 device detects 520 a mobile device over the short range network the vehicle device can connect 530 with the detected mobile device automatically. The vehicle device then determines 540 if the mobile device is connected to a power source. For example, the vehicle device can listen for a "charging" event in the operating system of the mobile device 110. In response to determining that the mobile device is powered, the vehicle device can trigger 550 an event in the mobile device to begin recording an onboard camera video. For example, the vehicle device may transmit instructions over the short range network causing the mobile device to activate an onboard camera recording application and begin onboard camera recording.

Figure 6:
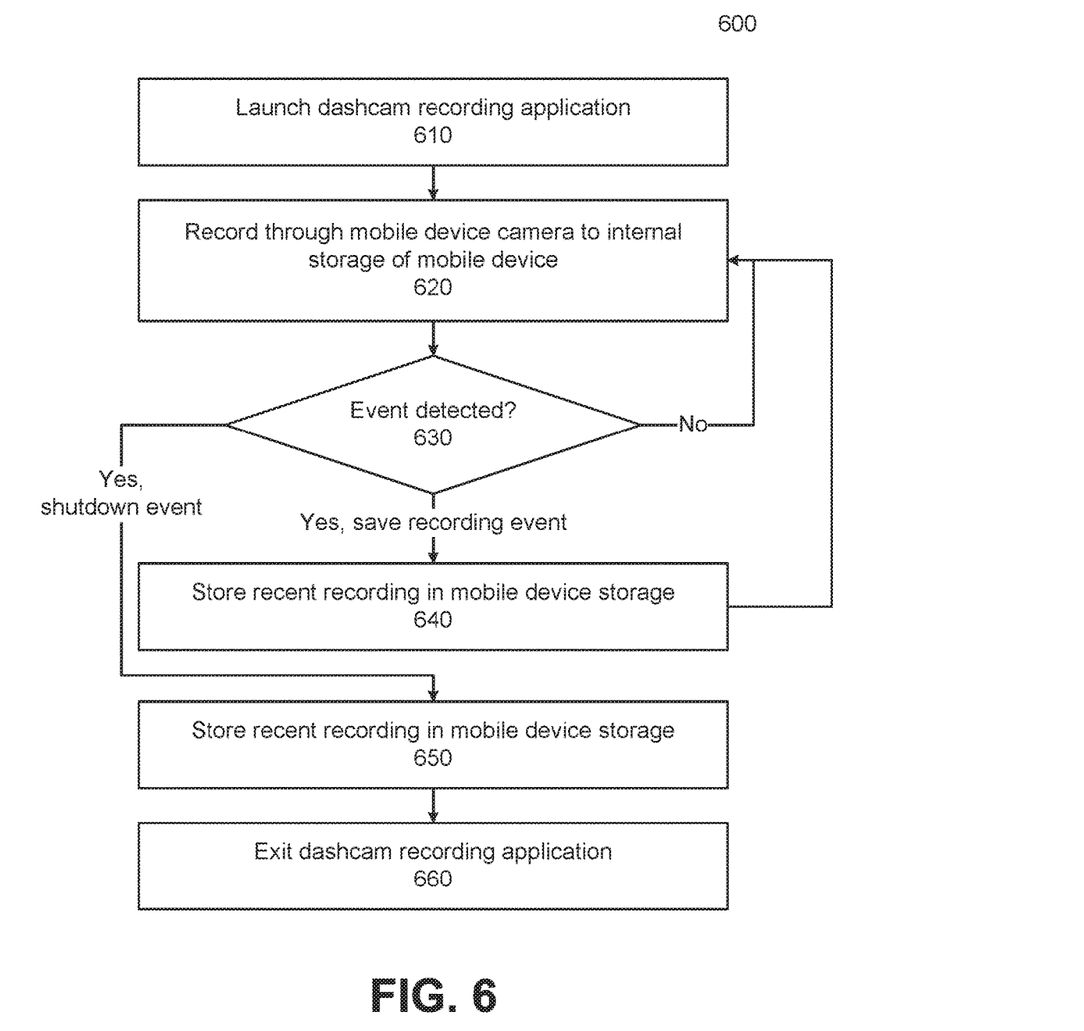
FIG. 6 is a flowchart illustrating an example process for recording onboard camera footage from a mobile device.

FIG. 6 is a flowchart illustrating an example process for recording onboard camera footage from a mobile device. The process 600 of FIG. 6 begins when an onboard camera recording application of the mobile device is launched 610. Then the mobile device records 620 onboard camera video through the mobile device camera to internal storage of the mobile device. Then, while recording, the mobile device checks for an event 630. If a "save recording" event is detected, the recent onboard camera video is stored 640 in the mobile device storage while the onboard camera recording continues 620. If the detected event is a shutdown event, the onboard camera recording 650 is stored as before, and then the onboard camera recording application is exited 660.

Additional Considerations

Configuring a mobile device 110 as an onboard camera to capture onboard camera video of the environment surrounding a vehicle 130 can provide many advantages to a user over traditional systems of onboard camera recording. For example, the mobile device 110 may be an existing mobile device personal to the user and therefore can reduce the cost of an onboard camera recording system compared to a traditional dashcam setup. Additionally, the communication capability of a mobile device 110 can allow onboard camera videos to be transmitted to an outside server 160 for safe storage. For example, the video may be encrypted for transmission to the outside server 160. Alternately, or in addition, the video also may be encrypted and/or physically secured to prevent tampering with recorded onboard camera videos or captured telematics data. Further by way of example, the user of a vehicle device 140 can allow onboard camera recording to be automatically started when the user operates a vehicle 130, without a need to separately remember to start the application and begin its operation.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described through the FIGS. herein. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed configuration. This description should be read to include one or at least one and the singular also includes the plural unless it is obvious that it is meant otherwise.

Upon reading this disclosure, those of skill in the art will appreciate still additional alternative structural and functional designs for using a mobile device for onboard camera recording for a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for capturing video through a device, the method comprising:

detecting, by a mobile device, a vehicle device over a short range network, the vehicle device associated with a specific vehicle;
establishing a connection over the short range network between the mobile device and the vehicle device, and
determining that the mobile device is connected to an external power source, wherein the vehicle device is configured to:
  connect to the mobile device over the short range network;
  responsive to connecting to the mobile device, detect a charging event on the mobile device; and
  responsive to detecting the charging event, send to the mobile device an instruction to activate an onboard camera recording application of the mobile device;
receiving, from the vehicle device, the instruction to activate the onboard camera recording application of the mobile device;
responsive to the receiving, activating the onboard camera recording application of the mobile device;
recording video through a camera of the mobile device based on the connection to the vehicle device and the determination that the mobile device is connected to an external power source; and
storing the recorded video to internal storage of the mobile device.

2. The method of claim 1 wherein recording video through a camera of the mobile device occurs responsive to activating the onboard camera recording application of the mobile device.

3. The method of claim 1, wherein the short range network is a Bluetooth Low Energy network.

4. The method of claim 1, further comprising receiving, from the vehicle device, an instruction to store recorded video to internal storage of the mobile device, and wherein the vehicle device comprises a user input and is configured to transmit instruction to the mobile device based on user interaction with the user input.

5. The method of claim 1, further comprising:
capturing, from a sensor of the mobile device, telematics data based on the connection to the vehicle device;
storing the captured telematics data to internal storage of the mobile device; and
associating the captured telematics data and the recorded video in the internal storage of the mobile device.

6. A non-transitory computer readable storage medium comprising instructions that, when executed by a processor, cause the processor to perform the steps of:
detecting, by a mobile device, a vehicle device over a short range network, the vehicle device associated with a specific vehicle;
establishing a connection over the short range network between the mobile device and the vehicle device, and
determining that the mobile device is connected to an external power source, wherein the vehicle device is configured to:
  connect to the mobile device over the short range network;
  responsive to connecting to the mobile device, detect a charging event on the mobile device; and
  responsive to detecting the charging event, send to the mobile device an instruction to activate an onboard camera recording application of the mobile device;
receiving, from the vehicle device, the instruction to activate the onboard camera recording application of the mobile device;
responsive to the receiving, activating the onboard camera recording application of the mobile device;
recording video through a camera of the mobile device based on the connection to the vehicle device and the determination that the mobile device is connected to an external power source; and
storing the recorded video to internal storage of the mobile device.

7. The non-transitory computer readable storage medium of claim 6 wherein recording video through a camera of the mobile device occurs responsive to activating the onboard camera recording application of the mobile device.

8. The non-transitory computer readable storage medium of claim 6, wherein the short range network is a Bluetooth Low Energy network.

9. The non-transitory computer readable storage medium of claim 6, further comprising instructions for receiving, from the vehicle device, an instruction to store recorded video to internal storage of the mobile device wherein the vehicle device comprises a user input and is configured to transmit instruction to the mobile device based on user interaction with the user input.

10. The non-transitory computer readable storage medium of claim 6, further comprising instructions for:
capturing, from a sensor of the mobile device, telematics data based on the connection to the vehicle device;
storing the captured telematics data to internal storage of the mobile device; and
associating the captured telematics data and the recorded video in the internal storage of the mobile device.

11. A system for capturing video through a device, the system comprising:
a vehicle;
a vehicle device associated with the vehicle; and
a mobile device configured to:
  detect the vehicle device over a short range network;
  establish a connection over the short range network with the vehicle device;
  determine that the mobile device is connected to an external power source;
  receive, from the vehicle device, an instruction to activate an onboard camera recording application of the mobile device;
  responsive to the receiving, activate the onboard camera recording application of the mobile device;
  record video through a camera of the mobile device based on the connection to the vehicle device and the determination that the mobile device is connected to an external power source; and
  store the recorded video to internal storage of the mobile device,
and wherein the vehicle device is configured to:
  connect to the mobile device over the short range network;
  responsive to connecting to the mobile device, detect a charging event on the mobile device; and
  responsive to detecting the charging event, send to the mobile device the instruction to activate the onboard camera recording application of the mobile device.

12. The system of claim 11, wherein recording video through a camera of the mobile device occurs responsive to activating the onboard camera recording application of the mobile device.

13. The system of claim 11, wherein the short range network is a Bluetooth Low Energy network.

14. The system of claim 11, wherein the mobile device is further configured to receive, from the vehicle device, an instruction to store recorded video to internal storage of the mobile device, and wherein the vehicle device further comprises a user input and is configured to transmit instruction to the mobile device based on user interaction with the user input.

* * * * *